Aug. 23, 1932.    A. B. MODINE    1,872,785
HEAT EXCHANGE DEVICE
Original Filed Feb. 23, 1929
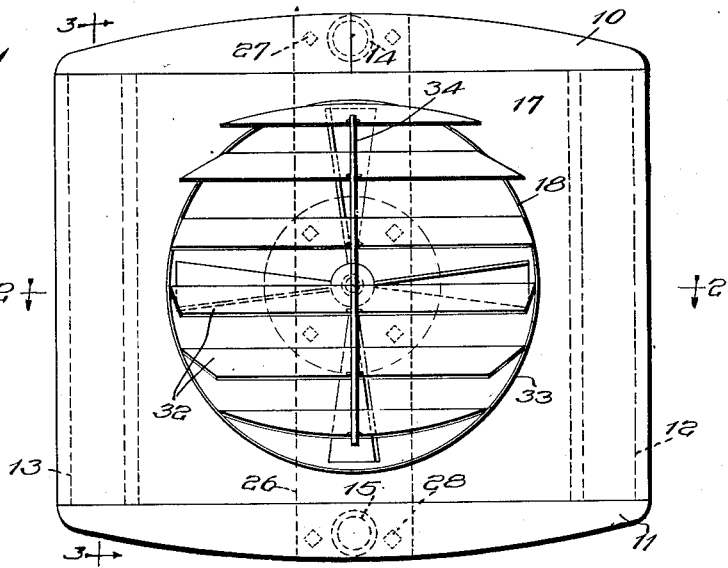
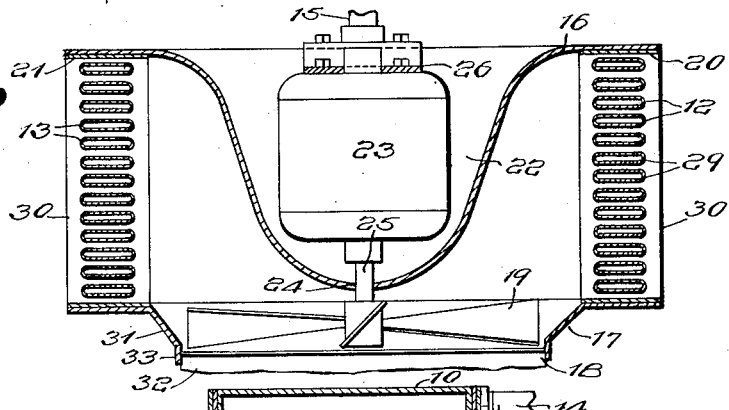
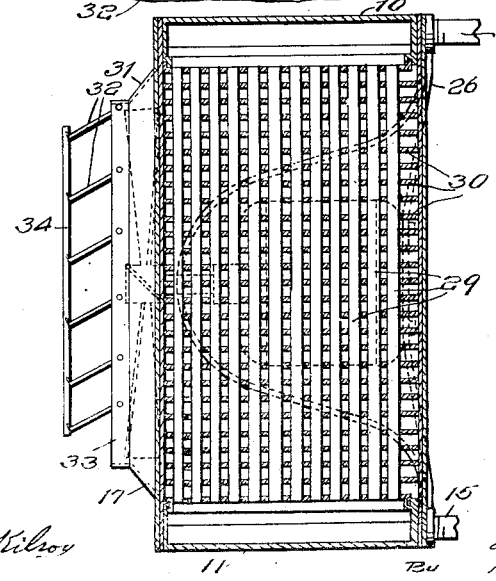
Witness:
William P. Kilroy
Inventor:
Arthur B. Modine
Hill Hill
Attys Patented Aug. 23, 1932

1,872,785

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

HEAT EXCHANGE DEVICE

Original application filed February 23, 1929, Serial No. 342,284. Divided and this application filed May 8, 1930. Serial No. 450,726.

My invention relates to an improved heat exchange apparatus for heating buildings, automobiles, dryers, or the like.

One object of the invention is to provide improved apparatus comprising a plurality of air circulating passages interspersed by water or steam circulating passages and having means incorporated therewith for forcibly driving air through the air passages for heating the air and for circulating the heated air throughout spaces to be heated, or about and upon articles to be dried.

A further object of the invention is to provide improved heat exchange apparatus of the type wherein one or more radiator units are combined with means for advancing air therethrough so that the whole apparatus operates as a unit.

A still further object of the invention is the provision of improved heat exchange apparatus having means for controlling the direction and the volume of the heated air discharged therefrom.

Another object of the invention is to construct the device to provide a box-like structure, opposed walls of which are comprised of tanks having radiator units arranged at opposed ends of the tanks and having a plate or other means extending across one of the open ends of the box-like structure, the plate providing a deflector and being recessed to provide a housing for an element of an air advancing means for advancing air through said radiators.

Another object of the invention is to provide said box-like structure with a closure for the opposite end thereof, the plate having an opening through which air may be advanced by a fan which is part of the air advancing means, the fan being arranged at one side of the plate which provides the housing and deflecting means.

The invention has these and other objects, all of which will be understood when read in conjunction with the accompanying drawing, it being obvious that changes and modifications may be resorted to without departing from the spirit of the appended claims forming a part hereof.

In the drawing, Fig. 1 is an end view of one form of my invention;

Fig. 2 is a section taken on the line 2—2 of Fig. 1; and

Fig. 3 is a section taken on the line 3—3 of Fig. 1.

This application is a division of my application filed February 23, 1929—Serial No. 342,284.

The embodiment of the invention illustrated in the drawing contemplates the utilization of a pair of tanks respectively designated 10 and 11 having heat exchange devices or radiators respectively designated 12 and 13 located adjacent the opposite ends of the tanks and connected therewith to form an open ended box-like structure permitting circulation of a heating fluid from the tank 10 through the radiators 12 and 13 and thence from the tank 11. The tank 10 is supplied with an opening 14 whereby fluid may be introduced to the tank 10 and the tank 11 is provided with an outlet opening 15, whereby fluid circulating from the tank 10 may be discharged from the device.

The structure including the tanks and the radiators, comprises what may be termed an open-ended box-like structure, the tanks forming opposite walls of the box and the radiator sections 12 and 13 forming other walls of the box. One end of the box-like structure just referred to is closed by a plate 16, the opposite end of said structure being closed by a plate 17. This last-mentioned plate has an opening 18 through which air is introduced or expelled and caused to move through the radiators or heat exchange units 12 and 13, it being understood that movement of the air is induced by means of a fan 19. It is evident that rotation of the fan in one direction will cause the air to be expelled from the radiators 12 and 13, and rotation thereof in the opposite direction will cause the air to be drawn through said radiators and expelled through the opening 18.

The plate 16 has its opposite edges connected with plates such as 20 and 21 which form part of a frame for the heat exchange units 12 and 13. This plate 16 extends inwardly of the box-like structure and is preferably curved in the manner illustrated, to thus form a recess 22. This plate 16 performs a dual function in that it provides a deflector for separating and guiding the air currents during their travel relatively to the heat exchange units 12 and 13, and in addition, provides a housing for the motor 23 provided for actuating the fan 19. The plate 16 is provided with an opening 24 through which the shaft 25 of the motor projects and it will be noted that the fan 19 is arranged between the plate 16 and the plate 17, and in addition, said plate 16 has the recessed portion thereof located adjacent the opening 18 provided in the plate or closure 17.

The motor 23 is supported with respect to the remaining elements of the structure through the medium of the bracket 26 which has its opposite ends respectively connected with the tanks 10 and 11, the bracket being secured in any suitable manner preferably through the agency of screws such as 27 and 28. The motor 23 is secured to the bracket in a similar manner.

The radiator units 12 and 13 are comprised of tubular water passages 29 which connect the tanks 10 and 11 with each other, tubes being provided with heat radiating fins 30.

It will be noted by referring to Figs. 2 and 3 that the plate 17, which forms a closure for one end of the structure, is formed to provide an annulus 31 in which the fan 19 rotates and that this plate provides means for supporting a deflector which is provided to control the direction of the air coming from the fan 19. The deflector comprises a plurality of transversely extending vanes 32 pivotally mounted on the flange 33. The ends of the vanes are curved so as to conform to the outline of the flange 33 when the deflector is closed. A rod 34 is operatively connected with each of the vanes 32 to provide means for simultaneously tilting the vanes to open and closed position.

It is obvious that the vanes may be given any desired inclination by moving the rod 30, thereby causing the heated air coming from the fan to be directed, to impinge on an object, such as for instance, as a freshly painted article, the drying of which is to be accelerated or the heated air may be directed upwardly, downwardly or horizontally through the room, it being understood that the vanes are held in their various adjusted positions through the means of frictional contact of the various parts which will retain the vanes in any adjusted position.

It is obvious that the plate 16, in addition to providing a deflector and a housing for the motor, provides a shield for insulating the motor against the heated air currents coming from the radiator units 12 and 13, and by virtue of the fact that this plate 16 is curved, said plate will direct the air currents set in motion by the fan, so as to either expel them from the radiators, or through the opening 18, depending upon the direction of rotation of the fan.

From the foregoing description of the structure, it is manifest that an extremely simple unitary device is produced which is of a more or less box-like formation, the walls of which are formed by means of the tanks 10 and 11 and the heat exchange units 12 and 13. It is further manifest that one end of the box-like structure is closed through the agency of the plate 16 which is formed to provide a recess, in which to house the motor 23 and to also provide means for protecting said motor against the heat of the air currents passing through the structure, and in addition, provides a deflector or guide for guiding the air currents passing through the device. It is further evident that the plate 17 provides a closure for the opposite open end of the box-like structure and that the fan for advancing air relatively to the heat exchange units 12 and 13 is located between the plate 16 and the closure 17. The fan 19 is preferably arranged for rotation within the annulus 31 formed in the plate 17 and the opening such as 18 provided in said plate is controlled through the agency of the vanes or louvers 32 which may be arranged to direct the air currents and also to regulate the amount of air passing through the device.

Having thus described the invention, what I claim and desire to cover by Letters Patent is:

1. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, a plate closing one end of said structure, said plate having an opening provided therein and air advancing means arranged with respect to said opening and providing means to advance air through said radiators and opening.

2. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, plates providing closures for the open ends of said box-like structure, a motor and a fan respectively located upon opposite sides of one of said plates, the other plate having an opening the fan being arranged with respect to said opening to advance air through said radiators and opening.

3. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, plates providing closures for the open ends of said box-like structure, one of said plates having an opening provided therein, air advancing means for advancing air through said radiators and opening, said air advancing means including a fan and a motor, the fan being arranged upon one side of one of the plates, the motor being located upon the opposite side of said plate, and said fan being arranged adjacent the opening provided in the first mentioned plate.

4. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, a plate providing a closure for one end of said box-like structure, said plate having a portion which projects into said box, a plate providing a closure for the opposite end of said box, said plate having an opening therein and air advancing means located with respect to said opening providing means for advancing air through said radiators and opening.

5. In apparatus of the kind described, a pair of spaced tanks, a radiator arranged at each end of said tanks and communicating with said tanks, said tanks and radiators providing an open ended box-like structure each of said tanks having an opening whereby fluid may be introduced to one of said tanks for circulation from said tank through said radiators and out of the other tank, a plate providing a closure for one end of said box-like structure, said plate having a portion which projects inwardly from the opposite edges of one end of said box-like structure, said plate being formed to provide a recess, a plate providing a closure for the opposite open end of said structure, said last mentioned plate having an opening, air advancing means for advancing air through said opening and radiators, said air advancing means including a fan and a motor for operating said fan, said motor being located in said recess and the fan being arranged adjacent said opening.

6. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, a plate providing a closure for one end of said box-like structure, said plate having a portion which projects inwardly from the opposite edges of one end of said box-like structure, said plate being formed to provide a recess, a plate providing a closure for the opposite open end of said structure, said last mentioned plate having an opening, air advancing means for advancing air through said opening and radiators, said air advancing means including a fan and a motor for operating said fan, said motor being located in said recess and the fan being arranged adjacent said opening, and means extending inwardly of said box-like structure providing a support for said motor.

7. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, a plate providing a closure for one end of said box-like structure, said plate having a portion which projects inwardly from the opposite edges of one end of said box-like structure, said plate being formed to provide a recess, a plate providing a closure for the opposite open end of said structure, said last mentioned plate having an opening, air advancing means for advancing air through said opening and radiators, said air advancing means including a fan and a motor for operating said fan, said motor being located in said recess and the fan being arranged adjacent said opening, and a motor support extending from one tank to the other across said recess and being secured to said tanks.

8. In apparatus of the kind described, a pair of spaced tanks, a radiator arranged at each end of said tanks and communicating with said tanks, said tanks and radiators providing an open ended box-like structure, each of said tanks having an opening whereby fluid may be introduced to one of said tanks for circulation from said tank through said radiators and out of the other tank, a plate providing a closure for one end of said box-like structure, said plate having opposed edges thereof connected to an edge of said radiators and being curved to provide a recess, a plate providing a closure, said plate having an opening, air advancing means for advancing air through said radiators and opening, said air advancing means including a motor and a fan, said motor being located in said recess and said fan being located between said plates.

9. In apparatus of the kind described, the combination of a pair of tanks, a radiator arranged at each end of said tanks, one of said tanks being provided with a fluid inlet and the other with an outlet, said tanks and radiators providing an open ended box-like structure, a member providing a closure for one end of said box-like structure and providing means for directing air through the opposite end of said structure and said radiators, air advancing means, an element of which is located at the open end of said structure.

10. In apparatus of the kind described, the combination of a pair of tanks, a radiator arranged at each end of said tanks, one of said tanks being provided with a fluid inlet and the other with an outlet, said tanks and radiators providing an open ended box-like structure, a motor, a fan operable by said motor and a member having a portion located between said fan and motor and extending therefrom to said tanks and radiators and providing means for directing air through said radiators and an end of said box-like structure.

11. In apparatus of the kind described, the combination of a pair of tanks, a radiator arranged at each end of said tanks, one of said tanks being provided with a fluid inlet and the other with an outlet, said tanks and radiators providing an open ended box-like structure, a member providing a support extending transversely of said structure, a motor mounted upon said member, a fan operable by said motor, and a member having a portion located between said fan and motor and extending therefrom to said tanks and radiators and providing means for directing air through said radiators and an end of said box-like structure.

In witness whereof, I hereunto subscribe my name this 25th day of April A. D., 1930.

ARTHUR B. MODINE.